United States Patent
Borup et al.

[11] Patent Number: 6,162,558
[45] Date of Patent: Dec. 19, 2000

[54] METHOD AND APPARATUS FOR SELECTIVE REMOVAL OF CARBON MONOXIDE

[75] Inventors: Rodney L. Borup, East Rochester; Glenn W. Skala, Churchville; Mark A. Brundage, Pittsford, all of N.Y.; William J. LaBarge, Bay City, Mich.

[73] Assignee: General Motors Corporation, Detroit, Mich.

[21] Appl. No.: 09/154,434

[22] Filed: Sep. 16, 1998

[51] Int. Cl.$^7$ ................................................ H01M 8/18
[52] U.S. Cl. ............................. 429/19; 423/247; 502/33
[58] Field of Search ................. 423/247; 502/33; 429/19, 20

[56] References Cited

U.S. PATENT DOCUMENTS

| | | | |
|---|---|---|---|
| 3,939,062 | 2/1976 | Sinfelt et al. | 208/140 |
| 4,172,817 | 10/1979 | Yates et al. | 208/140 |
| 4,303,552 | 12/1981 | Ernest et al. | 252/465 |
| 4,377,495 | 3/1983 | Tse . | |
| 4,417,083 | 11/1983 | Bernard et al. . | |
| 4,447,551 | 5/1984 | Fung et al. | 502/37 |
| 4,514,284 | 4/1985 | Wairegi et al. | 208/140 |
| 4,517,076 | 5/1985 | Boyle et al. | 208/140 |
| 4,518,708 | 5/1985 | Krishnamurthy et al. | 502/230 |
| 4,537,839 | 8/1985 | Cameron | 429/20 |
| 4,994,247 | 2/1991 | Tooley et al. | 423/247 |
| 5,009,872 | 4/1991 | Chuang et al. | 423/247 X |
| 5,017,357 | 5/1991 | Kolts et al. | 423/247 X |
| 5,114,901 | 5/1992 | Tsang et al. | 502/240 |
| 5,200,375 | 4/1993 | Dessau | 502/53 |
| 5,202,299 | 4/1993 | Symons et al. | 502/242 |
| 5,238,670 | 8/1993 | Louise et al. | 423/351 |
| 5,248,566 | 9/1993 | Kumar et al. | 423/247 X |
| 5,271,916 | 12/1993 | Vanderborgh et al. | 423/246 |
| 5,316,871 | 5/1994 | Swathirajan et al. | 429/33 |
| 5,482,680 | 1/1996 | Wilkinson et al. | 422/177 |
| 5,518,705 | 5/1996 | Buswell et al. | 423/247 |
| 5,612,012 | 3/1997 | Soma et al. | 423/247 X |
| 5,637,415 | 6/1997 | Meltser et al. | 429/17 |
| 5,702,838 | 12/1997 | Yasumoto et al. | 429/40 |

FOREIGN PATENT DOCUMENTS

| | | |
|---|---|---|
| 764 466 A2 | 3/1997 | European Pat. Off. ............ 29/74 |
| 7-256112 | 10/1995 | Japan . |
| 10-101303 | 4/1998 | Japan . |
| 10-261425 | 9/1998 | Japan . |

*Primary Examiner*—Stephen Kalafut
*Attorney, Agent, or Firm*—Lawrence B. Plant; Linda M. Deschere

[57] ABSTRACT

There is provided a method and apparatus for treatment of a hydrogen-rich gas to reduce the carbon monoxide content thereof by reacting the carbon monoxide in the gas with an amount of oxygen sufficient to oxidize at least a portion of the carbon monoxide in the presence of a catalyst in a desired temperature range without substantial reaction of hydrogen. The catalyst is an iridium-based catalyst dispersed on, and supported on, a carrier. In the presence of the catalyst, carbon monoxide in a hydrogen-rich feed gas is selectively oxidized such that a product stream is produced with a very low carbon monoxide content.

20 Claims, 6 Drawing Sheets

Reformate Flow

Cooling Medium Flow

FIG - 8  Ir PrOx Catalyst (not-activated)

FIG - 9  Effect of PrOx Activation Time On CO Oxidation

METHOD AND APPARATUS FOR SELECTIVE REMOVAL OF CARBON MONOXIDE

STATEMENT OF GOVERNMENT SUPPORT

The Government of the United States of America has rights in this invention pursuant to Agreement No. DE-AC02-90CH10435 awarded by the U.S. Department of Energy.

FIELD OF THE INVENTION

This invention relates to a method and apparatus for reducing the amount of carbon monoxide in a hydrogen-rich gaseous mixture by preferential oxidation of carbon monoxide.

BACKGROUND OF THE INVENTION

Fuel cells have been proposed for many applications including electrical vehicular power plants to replace internal combustion engines. Hydrogen is often used as the fuel and is supplied to the fuel cell's anode. Oxygen (as air) is the cell's oxidant and is supplied to the cell's cathode. A typical fuel cell is described in U.S. Pat. No. 5,316,871 to Swathirajan, et al.

The hydrogen used in the fuel cell can be derived from the reformation of methanol or other organics (e.g., hydrocarbons). Unfortunately, the reformate contains undesirably high concentrations of carbon monoxide which can quickly poison the catalyst of the fuel cell's anode, and accordingly must be removed. For example, in the methanol reformation process, methanol and water (as steam) are ideally reacted to generate hydrogen and carbon dioxide according to this reaction: $CH_3OH+H_2O \rightarrow CO_2+3H_2$.

This reaction is accomplished heterogeneously within a chemical reactor that provides the necessary thermal energy throughout a catalyst mass and actually yields a reformate gas comprising hydrogen, carbon dioxide, carbon monoxide, and water. One such reformer is described in U.S. Pat. No. 4,650,727 to Vanderborgh. Carbon monoxide (i.e., about 1–3 mole %) is contained in the $H_2$-rich reformate/effluent exiting the reformer, and must be removed or reduced to very low nontoxic concentrations (i.e., less than about 20 ppm) to avoid poisoning of the anode.

It is known that the carbon monoxide, CO level of the reformate can be reduced by utilizing a water-gas shift reaction also referred to as WGS or shift. In the shift reactor, water (i.e. steam) is added to the methanol reformate/effluent exiting the reformer, in the presence of a suitable catalyst, to lower its temperature, and increase the steam to carbon ratio therein. The higher steam to carbon ratio serves to lower the carbon monoxide content of the reformate according to the following ideal shift reaction: $CO+H_2O \rightarrow CO_2+H_2$.

Some CO still survives the shift reaction. Depending upon the reformate flow rate and the steam injection rate, the carbon monoxide content of the gas exiting the shift reactor can be as low as 0.5 mole %. Any residual methanol is converted to carbon monoxide and hydrogen in the shift reactor. Hence, shift reactor effluent comprises hydrogen, carbon dioxide, water and some carbon monoxide.

The shift reaction is not enough to reduce the CO content of the reformate enough (i.e., to below about 20 ppm). Therefore, it is necessary to further remove carbon monoxide from the hydrogen-rich reformate stream exiting the reactor, and prior to supplying it in the fuel cell. It is known to further reduce the CO content of $H_2$-rich reformate exiting the shift reactor by a so-called "PROX", (i.e., preferential oxidation) reaction effected in a suitable PROX reactor. The PROX reactor comprises a catalyst bed operated at temperatures which promote the preferential oxidation of the CO by air in the presence of the $H_2O$ but without consuming/oxidizing substantial quantities of the $H_2$. The PROX reaction is: $CO+\frac{1}{2}O_2 \rightarrow CO_2$.

Often, the $O_2$ required for the PROX reaction will be about 2 times the stoichiometric amount required to react the CO in the reformate. If the amount of $O_2$ is excessive, then excessive consumption of $H_2$ results. On the other hand, if the amount of $O_2$ is not more than the stoichiometric amount needed, insufficient CO oxidation will occur. The PROX process is described in a paper entitled, "Methanol Fuel Processing For Low Temperature Fuel Cells" published in the Program and Abstracts of the 1988 Fuel Cell Seminar, Oct. 23–26, 1988, Long Beach, Calif., and in Vanderbourgh, U.S. Pat. No. 5,271,916 and Meltser U.S. Pat. No. 5,637,415, inter alia. U.S. Pat. Nos. 5,271,916; 5,637,415; and 5,316,871 are each incorporated herein by reference in their entirety.

PROX reactors may be either (1) adiabatic, (i.e., where the temperature of the catalyst is allowed to rise during oxidation of the CO), or (2) isothermal (i.e., where the temperature of the catalyst is maintained substantially constant during oxidation of the CO). The adiabatic PROX process typically includes a number of sequential stages which progressively reduce the CO content. Temperature control is important in adiabatic systems, because if the temperature rises too much, a reverse water-gas shift reaction (RWGS) can occur which typically produces more CO. The isothermal process can produce the same CO reduction as the adiabatic process, but in fewer stages (e.g., one or two stages) and without concern for the reverse shift reaction.

In either case (i.e., adiabatic or isothermal), a controlled amount of $O_2$ (i.e., as air) is mixed with the reformate exiting the shift reactor, and the mixture passed through a suitable PROX reactor.

SUMMARY OF THE INVENTION

There is provided a method and apparatus for treatment of a hydrogen-rich gas to reduce the carbon monoxide content thereof by reacting the carbon monoxide in the gas with an amount of oxygen sufficient to oxidize at least a portion of the carbon monoxide in the presence of a catalyst in a desired temperature range without substantial reaction of hydrogen. The catalyst is an iridium-based catalyst dispersed on, and supported on, a carrier. In the presence of the catalyst, carbon monoxide in a hydrogen-rich feed gas is selectively oxidized such that a product stream is produced with a very low carbon monoxide content.

As a result, the concentration level of carbon monoxide is reduced to a level below about 0.1 volume percent, desirably below about 0.01 volume percent, most desirably below about 0.002 volume percent (20 ppm), and preferably below about 0.001 volume percent (10 ppm), while at the same time minimizing the consumption of hydrogen gas. Molar and volume quantities are used interchangeably herein to express relative amounts of constituents. Removal of carbon monoxide refers to the oxidation or conversion of carbon monoxide to carbon dioxide.

As mentioned earlier, the primary reaction involved in the process of the invention is: $CO+\frac{1}{2}O_2 \rightarrow CO_2$. As can be seen, the stoichiometric amount of oxygen required to react with carbon monoxide is 0.5 mole oxygen per mole of carbon monoxide. In order to promote oxidation of substantially all of the carbon monoxide, excess oxygen is used in an amount greater than a molar ratio of 0.5 mole oxygen per mole of carbon monoxide. The oxygen used is desirably an amount sufficient to oxidize substantially all of the carbon monoxide with minimal oxidation of hydrogen. The molar ratio of oxygen ($O_2$) to carbon monoxide (CO) is desirably less than about 3:1, most desirably less than 2:1, preferably less than 1:1, and optimally 0.5:1.

In the presence of oxygen, hydrogen will react as follows: $H_2 + \frac{1}{2} O_2 \rightarrow H_2O$. This reaction is undesirable as it consumes precious hydrogen fuel. In a preferred method, optimum catalyst preparation and reaction conditions are selected to provide, in combination with iridium catalyst, substantially selective oxidation of CO with minimal oxidation of $H_2$.

The invention provides a method for selective oxidation of carbon monoxide in the presence of hydrogen using a new combination of iridium based catalysts supported on refractory oxide carriers. The invention also provides new methods for activating the supported iridium (Ir) catalysts prior to their use for selective oxidation. The unique activation method of the invention provides the supported iridium in a preferred valence (oxidation) state for use in the selective conversion of carbon monoxide. Finally, the invention provides a fuel cell system which includes the new iridium/carrier combinations.

In one aspect, the invention provides iridium catalysts supported on a refractory oxide carrier where such refractory oxide is a porous inorganic metal oxide support with high surface area, so that when the iridium catalyst is dispersed onto the support, a high surface area of Ir catalyst is attained, thereby providing the advantage of utilizing the Ir to the largest degree possible. Such refractory oxide carriers typically do not have any activity by themselves. The supports of the invention are porous refractory inorganic oxides or ceramics. These supports are typically relatively inert as contrasted to zeolites which are structurally and actively different. Porous refractory oxide supports, including gamma, and delta alumina, are described in U.S. Pat. No. 4,303,552 which is incorporated by reference herein in its entirety.

Common support materials which may be used in the invention are: MgO; CaO; $Ca_2SiO_4$; BaO; $Ca_3SiO_5$; $ZrO_2$; $CeO_2$; $Cr_2O_3$; $La_2O_3$; $ThO_2$; alpha, delta, gamma and theta alumina ($Al_2O_3$); combinations such as theta/delta and gamma/delta; silicas and silicates; sodium borosilicate; $TiO_2$; $MgAl_2O_4$; $MgCr_2O_4$; $ZnCr_2O_4$; $ZnAl_2O_4$, $CaSiO_3$, $SiO_2$; $SiO_2$—$Al_2O_3$; and clay such as bentonite.

Among the catalyst supports are refractory oxide materials which are crystalline, others are amorphous, relatively unstructured, not fully crystalline. Among the preferred supports are alumina ($Al_2O_3$), including, but not limited to, gamma $Al_2O_3$, alpha $Al_2O_3$, theta $Al_2O_3$ and delta $Al_2O_3$. Another preferred support is sodium borosilicate $NaBSiO_4$. Surface areas range from about 260 $m^2$/gram for amorphous colloidal aluminas useful as binders, to less than 5 $m^2$/g for other refractory oxides. Exemplary combinations are as follows expressed in weight percents: 45% alpha alumina (3 $m^2$/g), 45% gamma alumina (100 $m^2$/g) and 10% binder (high surface area colloidal aluminum hydroxide gel); 45% delta (100 $m^2$/g), 45% gamma and 10% binder; 90–98% alumina (alpha, delta, gamma, theta and mixtures thereof) and 2–10% binder of bentonite clay or an alumina. The delta, gamma and theta transitional aluminas are used interchangeably. The alumina and sodium borosilicate may be used in a mixture together, for example, 30% delta $Al_2O_3$ and 70% sodium borosilicate.

In one embodiment of the invention, the iridium catalyst is prepared in a manner which provides the average oxidation state of the iridium (Ir) being less than +6. Desirably, at least two-thirds of the iridium is present with a valence state less than +6. More desirably, the average valence state of the iridium is less than +2 and greater than −1. It is preferred that more than half of the iridium present in the catalyst be present in a metallic iridium state. The amount of iridium relative to the amount of carrier is advantageously low and may constitute less than 3% by weight of the combined weight of iridium and carrier. As is typical in the art, the term "valence state" and "oxidation state" are used interchangeably.

The invention also provides a new method for activating the supported iridium catalyst prior to its use for selective oxidation, in order to provide iridium having the desired characteristics described above. The iridium is dispersed on the refractory oxide carrier and then the supported iridium catalyst is activated by contacting it with a gaseous medium comprising hydrogen and methanol where the amount by volume of hydrogen is greater than that of methanol, at an elevated temperature and for a time sufficient to cause the dominant X-ray photon spectroscopy peak of the iridium to shift toward a value which corresponds to iridium in a metallic state. Desirably, the gaseous medium comprises up to about 5% methanol, about 50% by volume hydrogen, and the balance of one or more gases selected from the group consisting of oxygen, nitrogen, carbon monoxide, carbon dioxide, and water.

In the method of the invention, the methanol is preferably present in an amount by volume of 0.5% to 2%. In the method of the invention, preferably, activation takes place at an activation temperature which is at least 180° C. and most preferably is in a range of 240–260° C.; and most preferably at about 260° C. The activation is desirably conducted for a time of up to about 2 hours.

After activation, the Ir-based catalyst is used for the selective conversion (oxidation) of carbon monoxide at a temperature in the range of about 80° C. to about 300° C. and desirably the temperature is about 150° C. to about 300° C., and preferably, about 210° C. to about 260° C. The pressure is not critical and extreme pressure is not required. Conveniently, a pressure in the range of one atm to three atm absolute pressure may be used.

The method conveniently provides a broad range of temperature and pressure within which the substantial conversion (oxidation) of carbon monoxide occurs, thus avoiding the need to adhere to rigid parameters. The method also permits a relatively broad range of oxygen concentration. The invention also provides conversion of CO very rapidly, using a residence time on the order of 10 to 50 milliseconds. These are important advantages in the context of an on-board vehicle power plant.

The method is conveniently carried out in a reactor which forms part of a fuel cell system. The system comprises a source of manufactured or produced gas that is hydrogen-rich; a reactor to provide a hydrogen-rich product stream having a reduced carbon monoxide content; and a fuel cell, which consumes the product stream formed in the reactor, to generate electric energy. This is more particularly described below.

The preferred catalyst/carrier of the invention is utilized to provide a low carbon monoxide content, high hydrogen content, fuel stream for a fuel cell. Therefore, the iridium/carrier combinations of the invention constitute an important part of a fuel cell system. The overall system comprises means for supplying a stream consisting of hydrogen and carbon monoxide that is hydrogen-rich on a volume basis compared to carbon monoxide. The selective oxidation means comprises a reactor defining a reaction chamber with an inlet and an outlet; an iridium catalyst supported on a carrier, and arranged to contact the stream passing between the inlet and the outlet. There is also included means for maintaining the reaction chamber at a temperature in a desired range to preferentially catalyze the oxidation of carbon monoxide to carbon dioxide, thereby decreasing the volumetric content of carbon monoxide. The oxidation means includes the iridium characterized by the average oxidation state being less than +6 and the carrier being characterized as a refractory oxide, all as described above. A fuel cell is included in the system and is in fluid flow communication with the outlet of the reaction chamber. The fuel cell is constructed and arranged to consume hydrogen-rich stream having the reduced volumetric content of carbon monoxide, thereby providing electrical energy.

In addition, the electrical energy provided by the fuel cell is ultimately converted to mechanical energy for vehicle propulsion. In this case, a circuit comprises the fuel cell and an electric motor constructed and arranged to accept electric energy from the fuel cell and to convert the electric energy to mechanical energy produced by the electric motor. A battery is arranged to accept and store electric energy supplied by the fuel cell as a part of the circuit, and to provide electric energy to the motor. Finally, the driving axle is constructed and arranged to rotate wheels of a vehicle when the axle is coupled to the electric motor. The method of the invention provides a relatively compact reactor for effective oxidation of carbon monoxide in real time to support the energy needs of the electric motor.

As can be seen from the description of the catalyst/carrier, the activation method, and the fuel cell system described above, the invention provides effective selective conversion of carbon monoxide within an overall system suitable for commercial use. In this respect, the catalyst/carrier, the reactor in which it is disposed, and the overall fuel cell system are usable over a broad range of temperatures and pressures so as to conveniently provide a feed stream for many commercial applications.

It is an object of the invention to provide a hydrogen-rich gas stream with a carbon monoxide content reduced to a level suitable for use in a fuel cell.

Another object is to provide a hydrogen-rich stream which meets requirements for direct use in a fuel cell, which is produced economically and efficiently, and which is produced by a method and in an apparatus capable of being incorporated into a vehicle power plant. Advantageously, the invention achieves carbon monoxide oxidation (conversion) with a surprisingly low level of hydrogen oxidation.

These and other objects, features and advantages will become apparent from the following description of the preferred embodiments, appended claims and accompanying drawings.

DESCRIPTION OF THE PREFERRED EMBODIMENTS

The supported iridium catalyst of the invention is usable to treat a CO contaminate in an $H_2$-rich stream, regardless of the method by which such stream was obtained. The stream may be prepared from methanol, or other hydrocarbons, for example, an alkane $C_nH_{2n+2}$, or other aliphatic or aromatic hydrocarbons. In the case of such acyclic hydrocarbons, several steps for preparation include prior partial oxidation in air, reaction with steam, and one or more water/gas shift steps to obtain the CO-contaminated $H_2$-rich stream to be treated in the PROX reactor by the iridium supported catalyst.

Figure 1:
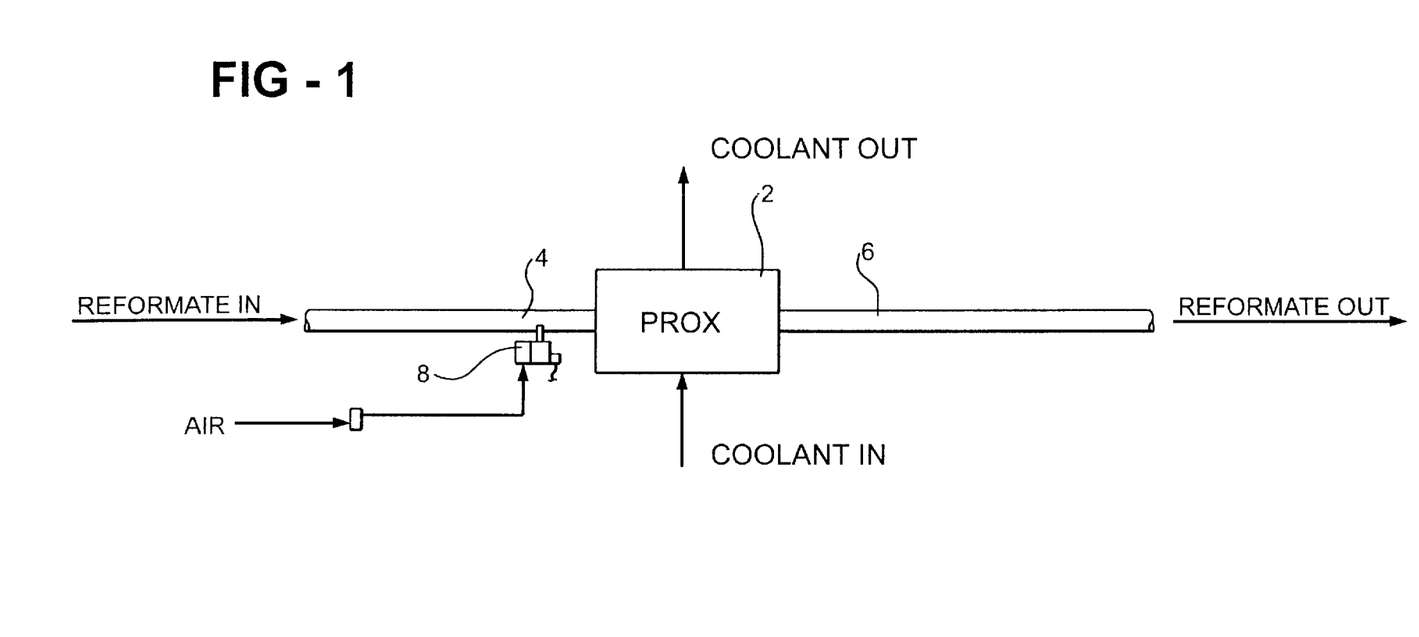
FIG. 1 schematically depicts a PROX system as per the present invention.

FIG. 1 depicts a single-stage PROX reactor 2 having an inlet conduit 4 conveying CO-contaminated, $H_2$-rich feed stream to the reactor 2 and an outlet conduit 6 for exhausting CO-lean, $H_2$-rich stream from the reactor 2. For purposes of illustrating the present invention, the PROX reactor 2 is shown as simply a single-stage reactor. However, it is to be understood that the following description is equally applicable to each of several stages in a multi-stage reactor. The CO-contaminated $H_2$-rich feed stream entering the PROX reactor 2 is mixed with oxygen (i.e., air) injected into the stream ahead of the PROX reactor 4 via a controllable valve 8, and exits the PROX reactor 2 having a significantly lower carbon monoxide content. Control valve 8 may be replaced by other means such as a pulsed air injector.

Figure 2:
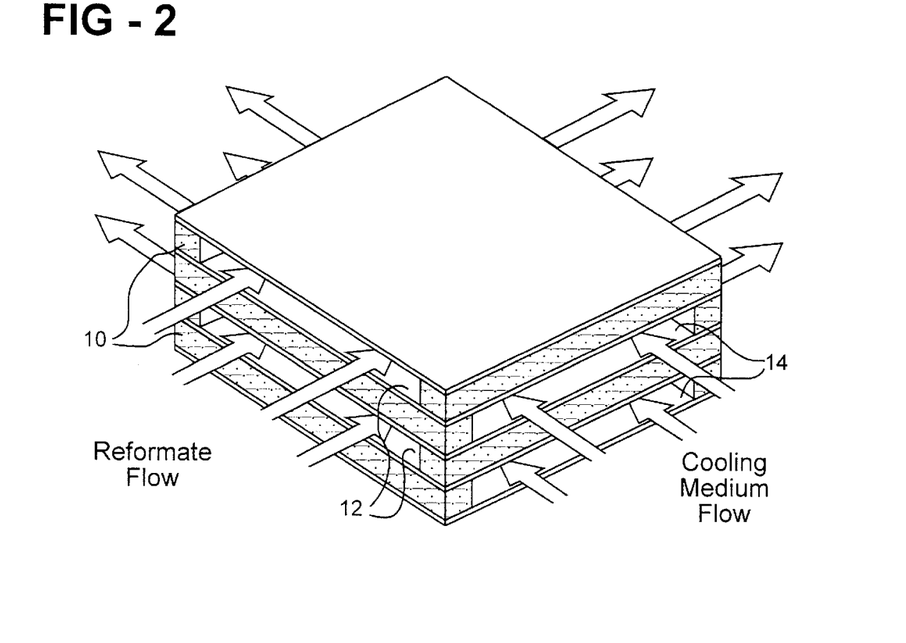
FIG. 2 schematically depicts the stacked substrate members which have a layer of refractory oxide carrying the Ir-based catalyst of the invention.

The PROX reactor 2 is designed to facilitate both selective oxidation of CO in the presence of the Ir-catalyst and to maintain the reaction chamber at a temperature in a desired range. The PROX reactor 2 includes support member substrates 10 as shown in FIG. 2. Support substrates 10 each have a first surface 12 carrying the catalytically active Ir, a second surface 14 opposite the first surface for heat transfer to a cooling medium. By this arrangement, the exothermic heat of the CO oxidation reaction is removed, thereby maintaining the catalyst at a desired temperature or range of temperatures. Therefore, the PROX reactor also functions as a heat exchanger.

In a dynamic fuel cell system, the flow rate of the reformate varies with the load demands put upon the fuel cell system, and the concentration of the carbon monoxide in the reformate varies with the flow rate of the reformate, if for no other reason than the reaction residence time in the reformer shift reactor varies.

One advantage of the iridium supported catalyst of the invention is that the residence time (1/space velocity) for treatment of the feed stream is very short. This is essential for real-time processing for providing fuel to a system which propels a vehicle, as further explained below.

Another advantage of the supported Ir catalyst is that it is prepared by adapting conventional washcoat methods used for catalytic converters. The procedures include post-impregnation by incipient wetness or spray dispersion of catalyst compound onto a refractory support. In an alternative approach, the catalyst compound is added to a refractory oxide slurry and applied to a substrate along with the refractory oxide washcoat. The iridium compound used as the source of the iridium catalyst is an iridium di, tri, tetra or hexa halide; or an iridium amine. The iridium chloride is preferred and is water soluble. Most preferred is iridium hexachloride. Procedures for preparing washcoats and for impregnating washcoats with metal-based catalyst will not be repeated here and are as described in U.S. Pat. No. 5,202,299, entitled "Catalytic Washcoat for Treatment of Diesel Exhaust, and U.S. Pat. No. 5,114,901, entitled "Ceramic Coating for a Catalyst Support", each of which is incorporated by reference herein in its entirety.

In the invention, metal support substrates were prepared with the supported Ir catalyst on one surface. The substrates were heated in air at up to 400° C. for about 1–2 hours to prepare the surfaces for better refractory metal oxide carrier adherence. The refractory oxide is applied to the surface as a slurry (washcoat) then dried and calcined, at about 400° C. for one hour, to fix in place. Then, an Ir-salt is added to the washcoat and fixed in place by drying, or calcining at a high temperature on the order of 400° C.

In alternative embodiments, the metal salt is included in the slurry and applied to the washcoat.

Calcining may occur before and after application of the metal salt. Alternatively, calcining may occur only after application of the carrier, and drying occur after impregnation of the metal salt into the carrier, as by incipient wetness method.

EXAMPLE I

The new iridium base supported catalyst of the invention was prepared and then activated. The preparation began by applying a high surface area alumina support washcoat on a 316-type stainless steel. The applied alumina washcoat was dried at about 80° C. and then calcined at about 500° C. to fix the washcoat in place. The composition of the metal substrate was not found to be critical and aluminum alloys may also be used. Next, the iridium catalyst was deposited onto the high surface area alumina and was calcined to fix the washcoat layer in place and to cause adherence of the iridium-based catalyst to the washcoat. The solution used for deposition of the catalyst was iridium chloride dissolved in water. The alumina was a delta $Al_2O_3$.

After calcination, the catalyst was activated by using a gaseous medium containing about 50% hydrogen, about 0.5% methanol, and the rest of the gaseous medium comprised nitrogen, carbon monoxide, water and air. More specifically, the gas composition was 48% hydrogen; 1.5% oxygen; 6.5% nitrogen; 0.5% carbon monoxide; 34% carbon dioxide; 8% water. This composition is similar to a typical reformate product stream. The methanol was added to this stream; and the methanol content in this example was 0.5%.

The activation was conducted for a period of about 2 hours at a temperature of about 260° C. It was found that lower activation temperatures are usable, however the activation was slower, thus required more time. In addition, methanol content was increased to 1% and 2%, content in excess of 2% did not improve results.

The pressure of activation was about 30 psig and the residence time of the activating composition was about 50 milliseconds. The reactor residence time is defined as 1 over the value of space velocity. This residence time, on the order of 50 milliseconds or less, reflects the very compact and small selective oxidation reactor used in this test.

The catalyst, as prepared and activated above, was then used as a preferential oxidation catalyst and a reactor for selectively oxidizing carbon monoxide in a hydrogen-containing atmosphere.

Figure 3:
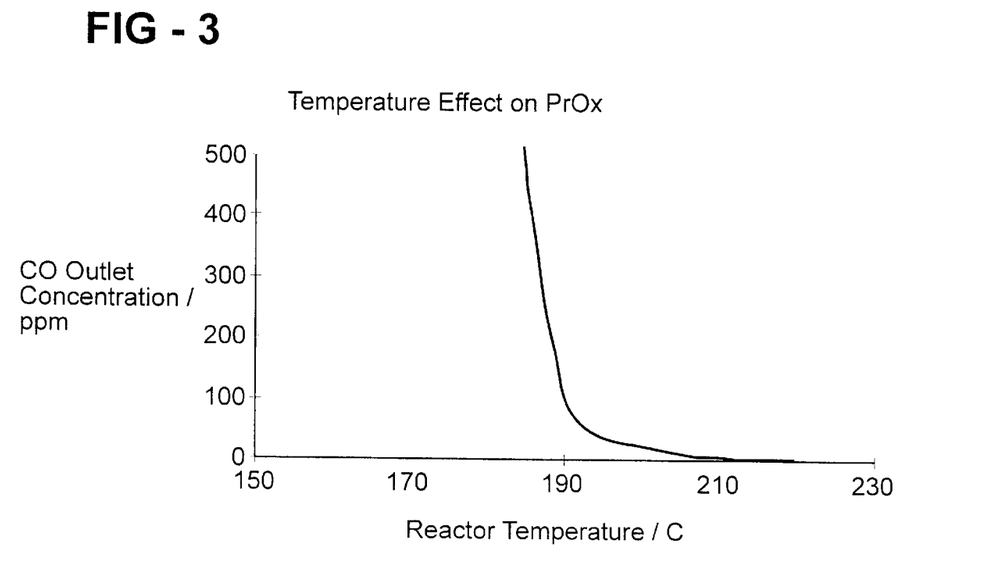
FIG. 3 is a diagram of carbon monoxide conversion as a function of temperature for an Ir catalyst supported on alumina, and treated with methanol to achieve activation as per Example I.

FIG. 3 shows the effect of temperature on the carbon monoxide outlet concentration. The experiment was conducted with varying inlet carbon monoxide concentrations and with varying inlet concentration of oxidizing air (oxygen). The constituents of the stream treated were the same as for methanol activation except that methanol was not included. The experimental configuration was a flat plate isothermal reactor so that the exothermic reaction heat was removed. In other words, the reactor was also a heat exchanger with selective oxidation occurring at a first surface of the flat plate carrying the iridium catalyst, and a heat transfer fluid contacted the opposite surface of the flat plate for maintaining the catalyst at a constant temperature.

In one set of experiments, the inlet CO concentration was 0.65% with 10% added air. Other experiments were conducted by reducing the amount of air and increasing the temperature. At a temperature of 200° C. or above, the CO was oxidized down to less than 20 ppm, which was the desired level. At a temperature of about 230° C., 0.55% CO was decreased to 10 ppm, using 5% added air. No significant increase in CO outlet concentration was observed up to about 260° C. With a 10% air and 0.65% inlet CO, the ratio of $O_2$:CO was 3:1. At 0.55% CO, and 5% air, the ratio of $O_2$:CO was 2:1.

Figure 4:
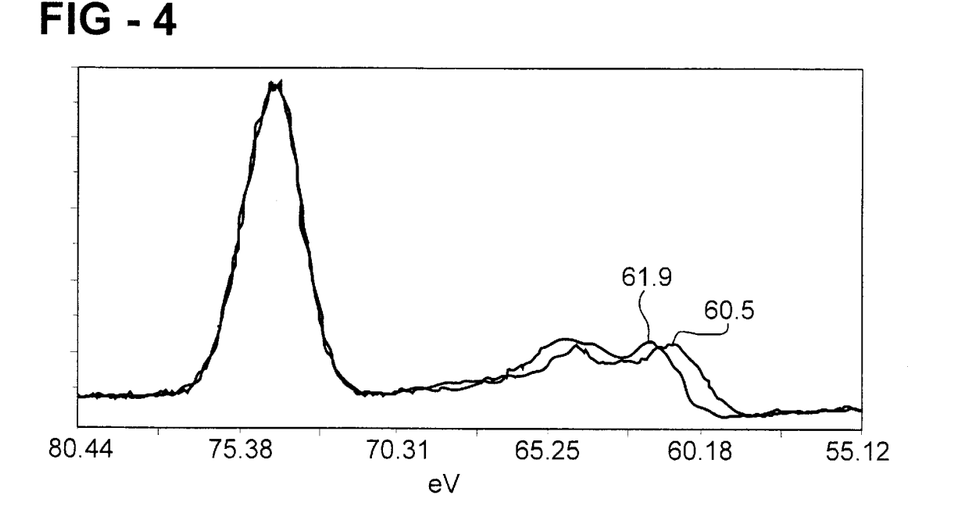
FIG. 4 is an X-ray spectrum produced by the excitation of the analyzed sample using aluminum K-alpha X-ray source. This demonstrates the suitability of the XPS method for detecting Ir energy levels.

In order to demonstrate the benefits of the activation method, XPS (X-ray photoelectron spectroscopy) analysis was conducted on the supported iridium catalyst, before and after the activation with methanol. Iridium has two transitions, the 4F7/2 peak and the 4F5/2 peak. The Ir4F7/2 peak is the predominant Ir peak, thus it was the basis for the XPS analysis, being the dominant peak, for relative quantification. A peak at 61.9eV corresponds to $IrO_2$. A peak at 60.5eV corresponds to Ir in the metallic state. This was confirmed by sputtering an $IrO_2$ sample. The $IrO_2$ had an initial peak at 61.9, and after sputtering, the Ir peak had shifted toward the value corresponding to metallic Ir, at 60.5eV. FIG. 4 shows the results of demonstrating the suitability of XPS analysis utilizing the predominant Ir peak. The predominant Ir peak before ($IrO_2$) was at about 61.9 and after was at about 60.5 corresponding to metallic Ir, demonstrating that a shift could be readily detected.

Figure 5:
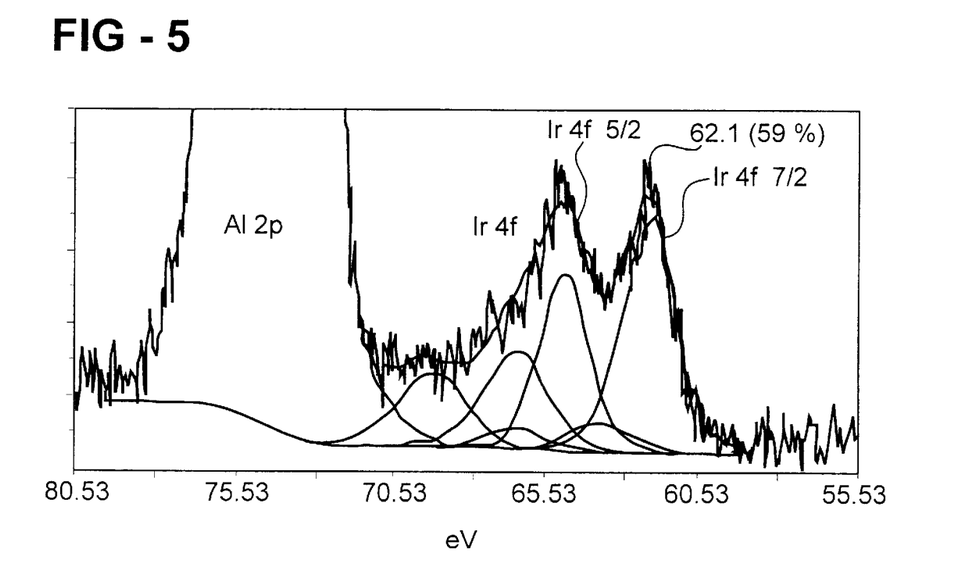
FIG. 5 is an X-ray spectrum, produced by the aluminum K-alpha method as per FIG. 2, for an Ir catalyst supported on alumina, before activation by methanol treatment.

Based upon this verification, XPS of the supported Ir samples was conducted for a sample as-prepared, before activation. As per FIG. 5, in this before-activation sample, some of the Ir has a binding energy state at about 62.1eV (59%), which is the predominant 4f7/2 peak. High levels of Ir are also at a higher binding energy of about at the 4f5/2 peak of 66.6 (41%) reflecting a higher oxidation state. See FIG. 5.

Figure 6:
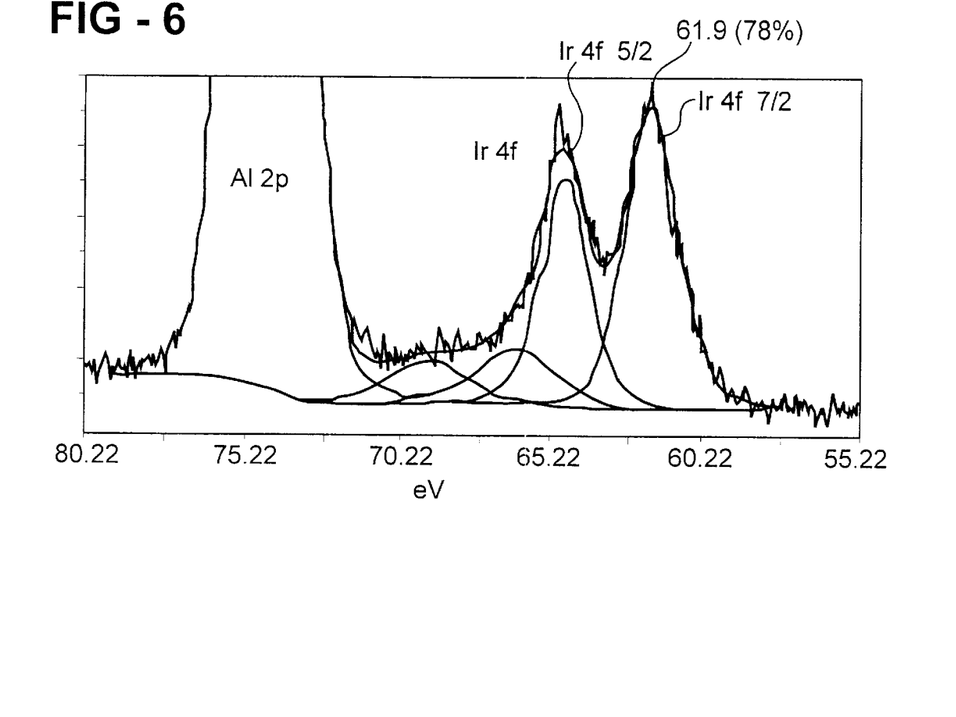
FIG. 6 is an X-ray spectrum, produced by the aluminum K-alpha method as per FIG. 2, for an Ir catalyst supported on alumina, after activation by methanol treatment.

After activation, the condition of the Ir is as shown in FIG. 6. After activation, the Ir presents a predominant 4f7/2 peak at 61.9 (78%). In addition, some of the Ir is at a higher binding energy state reflected by the 4f5/2 peak at 66.5 (22%). It is apparent that the activation procedure lowers the binding energy state of at least part of the iridium and causes reduction of the iridium from a higher oxidation (valence) state to a lower oxidation (valence) state. Therefore, the benefits of the activation procedure of the invention is evident since it lowers the binding energy and lowers the oxidation state (valence state) of the iridium.

The X-ray photoelectron spectroscopy of the invention was conducted by the irradiation of the supported Ir with monoenergetic X-rays and analysis of emitted electrons from the irradiated sample. A monochromatized aluminum K-alpha X-ray source was used to stimulate photo-emission of the analyzed sample. The emitted electrons were analyzed by a hemispherical analyzer with an electron lens. The binding energy was calculated from the kinetic energy of the emitted electrons and the energy of the X-ray source. An X-ray spot size of 300 microns was used with a 3.0eV flood gun to prevent sample charging.

EXAMPLE II

Iridium supported on a carrier was prepared using as the carrier a mixture of delta $Al_2O_3$ and $NaBSiO_4$ (delta alumina/sodium borosilicate). This refractory oxide composition was deposited onto one surface of the flat plates described earlier. Next, the deposited washcoat was dried and then calcined to fix it in place as described in Example I. Next, the dissolved iridium chloride solution was applied to the washcoat support and calcined to fix the iridium catalyst in place. The catalyst of this example constituted 2% by weight iridium and 98% by weight washcoat support. The washcoat support was 30% by weight delta alumina and 70% by weight sodium borosilicate.

Figure 7:
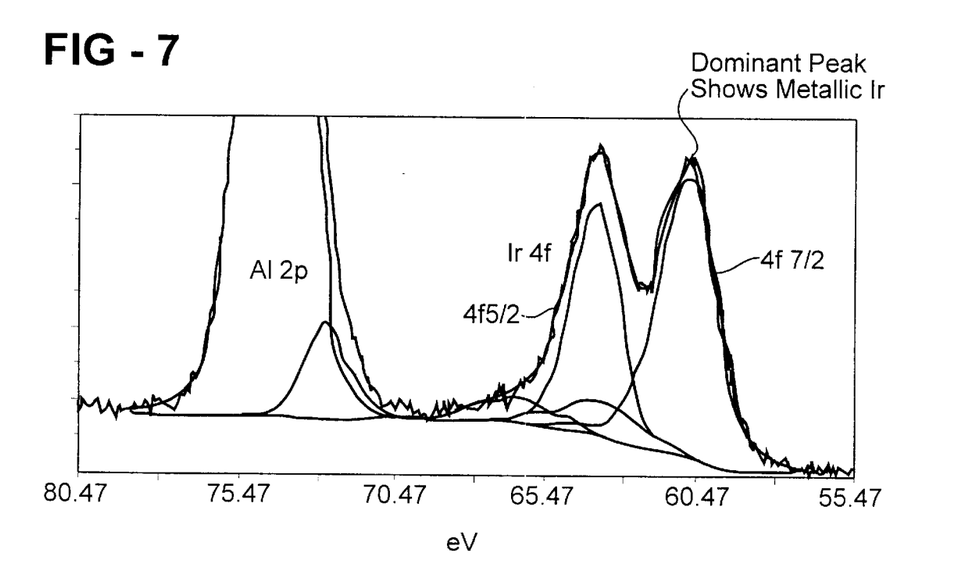
FIG. 7 is an x-ray spectrum, produced by the aluminum K-alpha method as per FIG. 2, for an Ir-catalyst supported on a mixed delta-alumina and sodium borosilicate oxide support. There was no methanol activation for this supported Ir catalyst, as per Example II.

An XPS analysis of this supported iridium catalyst was conducted. It was found that the oxidation state of the iridium in an as-prepared condition, was already acceptably low, with 84% by weight of the iridium being in the metallic state. Referring to FIG. 7, it can be seen that the XPS spectra indicates 84% metallic iridium (Ir 4f7/2), and only 16% iridium having a higher binding energy (Ir 4f5/2). In addition, the BET surface area was found to be 71.8 square meters per gram; Ir loading of 0.18 square meter per gram. Induced coupled plasma atomic emission spectroscopy showed 3.7% Ir. The elemental composition was consistent with the above findings and also shows amounts of other constituents which were expected based on the exposure of this sample to air.

TABLE 1

| CATALYST: 2% Ir/30% δ-$AL_2O_3$:70% $NaBSiO_4$ | | | |
|---|---|---|---|
| Ir Chemical State Results, % of Ir | | | |
| Specimen | Ir Metal | $IrO_2$ | Higher Binding Energy Peaks |
| PR8 | 84 | — | 16 |

BET SA: 71.8 $m^2$/g
XRF (Ir loadings): 0.18 $m^2$/g
ICP-AES (induced coupled plasma atomic emission spectroscopy): 3.7% Ir

| Semiquantitative Elemental Composition, Atomic %, XPS, Except H | | | | | | |
|---|---|---|---|---|---|---|
| Surface | CO | Ir | Al | Si | Na | P | Other |
| PR8 | 14 | 56 | 0.5 | 22 | 3 | 1.9 | 2.2 Zn |

Comparative Example

Figure 8:
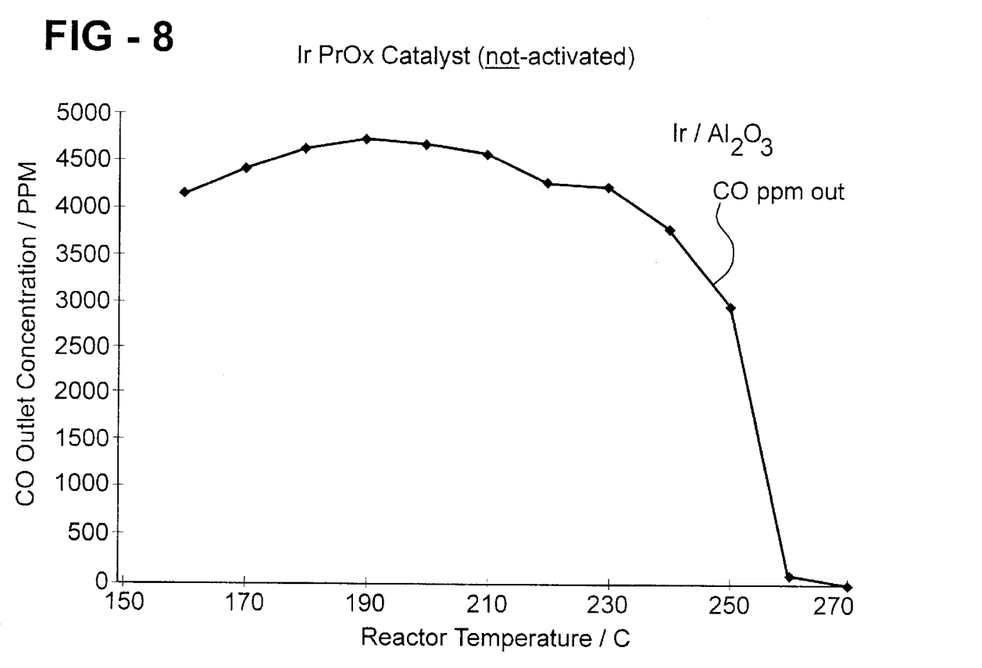
FIG. 8 is a diagram of carbon monoxide conversion as a function of temperature for an Ir catalyst supported on alumina, before activation by methanol treatment, per the Comparative Example.

An alumina support carrying an iridium metal catalyst was prepared in the method as described per Example I, except that no methanol activation was conducted. This alumina supported iridium catalyst showed an XPS fingerprint similar to that of the before-activation graph of Example I. FIG. 8 shows the performance of such an alumina-supported iridium catalyst in the as-received condition. This catalyst was exposed to a hydrogen-rich stream containing the contaminant carbon monoxide having the composition as described with respect to Example I. This catalyst, in normal operation, showed no change in activity of the catalyst, and is in striking contrast to the graph of carbon monoxide outlet concentration versus temperature described with respect to Example I (FIG. 3).

EXAMPLE III

Figure 9:
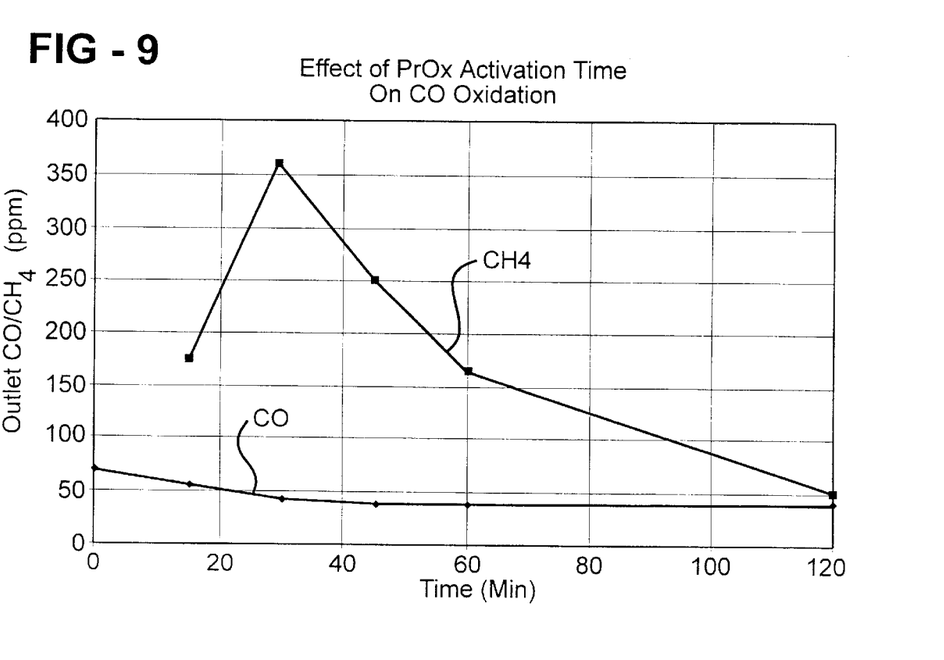
FIG. 9 shows outlet CO concentration versus activation time duration. (Example III).

Another sample of 2% iridium supported on $Al_2O_3$/$NaBSiO_4$ was prepared, and was the same as that of Example II. This sample was subjected to an activation procedure. The activation procedure was the same as described with respect to Example I. The performance of this sample did not change with exposure to methanol. FIG. 9 shows that the amount of CO in the outlet stream did not change with activation time. This is consistent with the XPS data of Example II showing that the valence state of the iridium on the $Al_2O_3$/$NaBSiO_4$ was in a preferred condition, as prepared, without activation. Therefore, this catalyst performed well as prepared, and did not require methanol activation.

Figure 10:
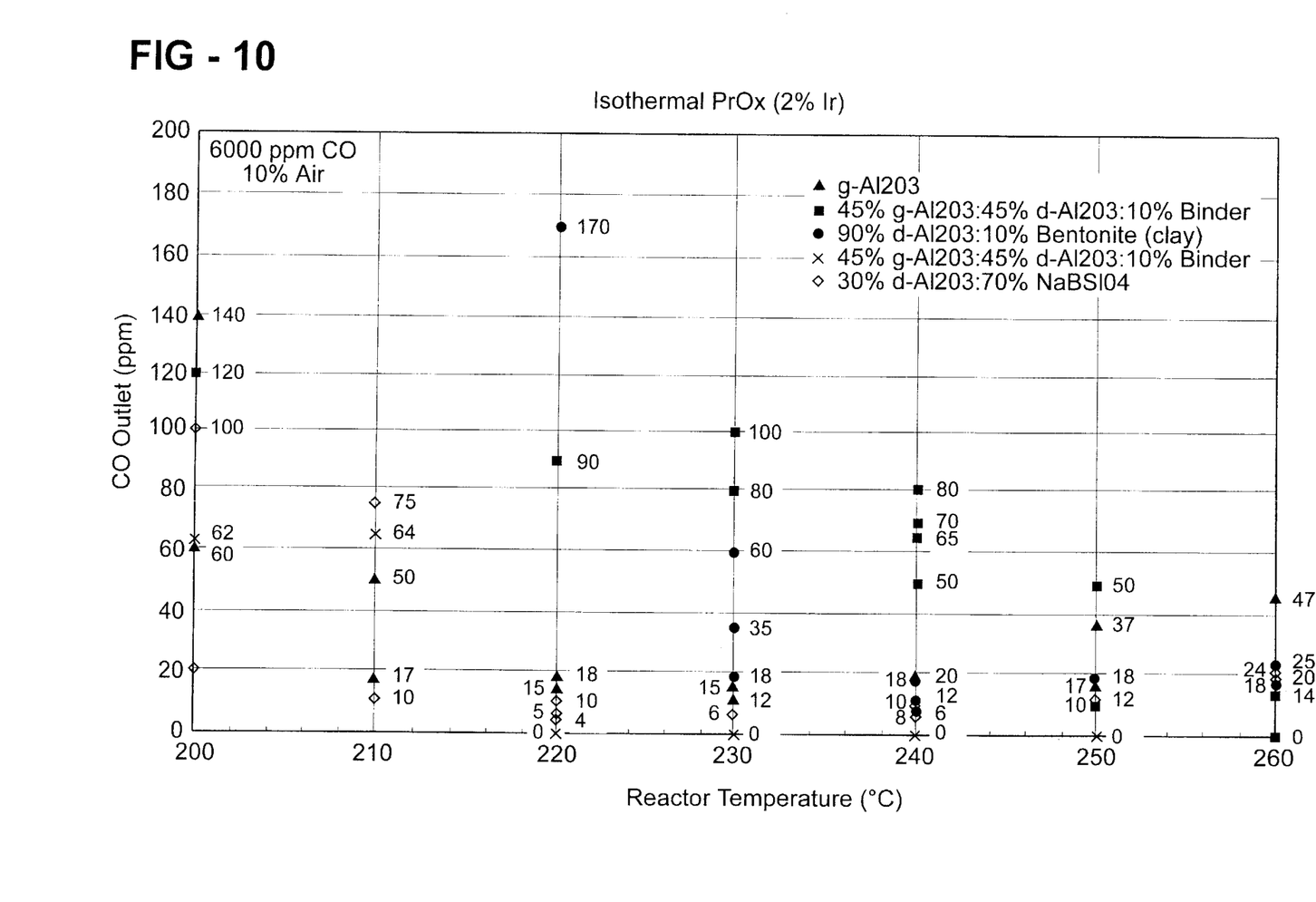
FIG. 10 shows outlet CO concentration reduced from a 6000 ppm inlet concentration using 10% air at various temperatures. The performance of several supports carrying 2 weight percent iridium are shown.

Other supported iridium catalyst formulations were prepared in accordance with the method of the examples described above, and using various combinations of refractory inorganic oxide supports. In all cases, 2% weight of iridium was used with 98% by weight support. The results of testing these other supported catalysts for reduction of carbon monoxide are shown in FIG. 10. In FIG. 10, the data represented by triangles is for a gamma alumina supported iridium; data represented by boxes is for a 45% gamma, 45% delta alumina with 10% binder; data represented by circles is for a delta alumina in combination with a bentonite clay binder; data represented by an x is for 45% gamma, 45% delta alumina and 10% binder; finally the data represented by the diamond is for a preferred formulation 30% delta alumina and 70% sodium borosilicate. The performance of each of these catalyst supports was monitored for a variety of reaction temperatures from 200° C. up to 260° C. The delta alumina/sodium borosilicate support demonstrated good carbon monoxide oxidation selectivity over a broad temperature range. As mentioned earlier, the delta alumina/sodium borosilicate washcoat support did not require methanol activation. Its performance was very good over a broad temperature range. Good performance (providing 20 ppm carbon monoxide outlet content) was achieved using most of the supports when the temperature was about 220° C. or more. Advantageously, a variety of supports is usable, because the methanol activation method of the invention prepares the supported iridium for good carbon monoxide oxidation selectivity regardless of the support used.

The invention demonstrates that the method of preparation of the refractory oxide supported iridium catalyst is of key importance in determining its subsequent effectiveness for selective oxidation of carbon monoxide in a hydrogen stream.

Advantageously, the invention provides a hydrogen-rich stream which meets the requirements for use in a fuel cell, which is produced economically and efficiently, and which is produced by a method and in an apparatus capable of being incorporated into a vehicle power plant.

While this invention has been described in terms of certain embodiments thereof, it is not intended that it be limited to the above description but rather only to the extent set forth in the following claims.

The embodiments of the invention in which an exclusive property or privilege is claimed, are defined in the following claims.

What is claimed is:

1. A method of treating a feed gas comprising carbon monoxide and hydrogen, which comprises:

reacting the carbon monoxide in the feed gas with an amount of oxygen sufficient to oxidize at least a portion of the carbon monoxide in the presence of an iridium catalyst dispersed on a refractory carrier such that a product gas is produced with a volumetric content of carbon monoxide that is less than that of the feed gas; and wherein a portion of the iridium is in a metallic state and a portion of the iridium is in a valence state higher than metallic iridium.

2. The method of claim 1 wherein the average valence state of the iridium is less than 6.

3. The method of claim 1 wherein the iridium is supported on a carrier comprising alumina ($Al_2O_3$).

4. A method of treating a feed gas comprising carbon monoxide and hydrogen, which comprises:

reacting the carbon monoxide in the feed gas with an amount of oxygen sufficient to oxidize at least a portion of the carbon monoxide in the presence of an iridium catalyst dispersed on a refractory inorganic oxide carrier such that a product gas is produced with a volumetric content of carbon monoxide that is less than that of the feed gas; wherein the iridium is supported on a carrier comprising a mixture of alumina and sodium borosilicate ($NaBSiO_4$).

5. The method of claim 1 wherein at least ⅔ of the iridium is present with a valence state less than +6.

6. The method of claim 1 wherein the average valence state of the iridium is less than 2 and greater than −1.

7. The method of claim 1 wherein at least ¾ of the iridium is present in a metallic iridium state.

8. The method of claim 1 wherein the reaction is conducted substantially isothermally on said catalyst maintained at a substantially constant temperature.

9. The method of claim 1 wherein the reaction is conducted at a temperature of about 80° C. to about 300° C.

10. The method of claim 1 wherein the reaction is conducted at a temperature of about 210° C. to about 260° C.

11. In a method of treating a feed gas comprising carbon monoxide and hydrogen to reduce the amount of carbon monoxide therein and produce a product gas by reacting the carbon monoxide with oxygen in the presence of a catalyst, the improvement comprising:

a) providing an iridium catalyst supported on a refractory oxide carrier;

b) activating the catalyst by contacting said catalyst with a gaseous medium comprising hydrogen and methanol at a temperature and for a time sufficient to cause the dominant x-ray photoelectron spectroscopy (XPS) peak of the iridium to shift toward a value which corresponds to iridium in the metallic state; wherein said hydrogen constitutes the greatest amount by volume of said gaseous medium and wherein said methanol is present in an amount of up to about 5% by volume of said gaseous medium: and c) treating said feed gas with the activated catalyst of step (b).

12. The method of claim 11 wherein the gaseous medium comprises up to about 5% methanol, about 50% by volume hydrogen, and the balance one or more gases selected from the group consisting of oxygen, nitrogen, carbon monoxide, carbon dioxide, and water.

13. The method of claim 11 wherein methanol is present in an amount by volume of 0.5% to 2%.

14. The method of claim 11 wherein the temperature is at least about 180° C.

15. The method of claim 11 wherein the temperature is in a range of about 180° C. to about 260° C.

16. The method of claim 11 wherein the heating is conducted for a time of up to about 2 hours.

17. A fuel cell system comprising:

a. a source of a stream comprising hydrogen and carbon monoxide that is hydrogen-rich on a volume basis compared to carbon monoxide;

b. means for selectively oxidizing the carbon monoxide in the stream comprising: (i) a reactor defining a reaction chamber with an inlet and an outlet; (ii) an iridium catalyst dispersed and supported on a carrier within said chamber and arranged to contact the stream passing between the inlet and outlet; and (iii) a heat transfer medium arranged to exact heat from the reaction chamber to maintain the chamber at a predetermined temperature to preferentially catalyze the oxidation of carbon monoxide by oxygen in the stream to produce a carbon monoxide depleted effluent, said iridium having an average oxidation state less than 6, and said carrier consisting essentially of a refractory inorganic oxide; and c. a fuel cell in fluid flow communication with the outlet of the reaction chamber and constructed and arranged to consume the effluent in the production of electrical energy.

18. The fuel cell system of claim 17 wherein the carrier is an alumina-based carrier.

19. The fuel cell system of claim 17 wherein the carrier is a mixture of alumina and sodium borosilicate.

20. The fuel cell system of claim 17 wherein said carrier comprises 30% by weight delta $Al_2O_3$ and 70% by weight $NaBSiO_4$.

* * * * *